US009549439B2

(12) United States Patent
Lee et al.

(10) Patent No.: US 9,549,439 B2
(45) Date of Patent: Jan. 17, 2017

(54) DISPLAY APPARATUS AND METHOD OF DRIVING BACKLIGHT THEREOF

(71) Applicant: SAMSUNG ELECTRONICS CO., LTD., Suwon-si (KR)

(72) Inventors: Kyu-heon Lee, Hwaseong-si (KR); Sung-hwan Jang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 187 days.

(21) Appl. No.: 14/326,726

(22) Filed: Jul. 9, 2014

(65) Prior Publication Data

US 2015/0130364 A1 May 14, 2015

(30) Foreign Application Priority Data

Nov. 14, 2013 (KR) ........................ 10-2013-0138326

(51) Int. Cl.
*G06F 3/038* (2013.01)
*H05B 33/08* (2006.01)
*G09G 3/34* (2006.01)

(52) U.S. Cl.
CPC ........ *H05B 33/0815* (2013.01); *G09G 3/3406* (2013.01); *H05B 33/0845* (2013.01); *G09G 2230/00* (2013.01); *G09G 2310/0237* (2013.01); *G09G 2320/0247* (2013.01); *G09G 2320/0257* (2013.01); *G09G 2320/064* (2013.01)

(58) Field of Classification Search
CPC .................................... G09G 3/36; G09G 3/32
USPC ................ 315/169.1, 169.3; 345/76–78, 204
See application file for complete search history.

(56) References Cited

U.S. PATENT DOCUMENTS

2008/0094383 A1* 4/2008 Stessen ................ G09G 3/3406 345/209
2008/0165117 A1* 7/2008 Jung ...................... G09G 3/342 345/102
2008/0284691 A1* 11/2008 Chung ................ G09G 3/3291 345/76
2012/0068978 A1* 3/2012 Aitken ................ G09G 3/3406 345/207
2013/0082615 A1* 4/2013 Williams ........... H05B 33/0827 315/186
2013/0278651 A1* 10/2013 Yamamura ............... G09G 3/36 345/691

FOREIGN PATENT DOCUMENTS

EP 2645358 A2 10/2013
WO 2007125451 A1 11/2007

OTHER PUBLICATIONS

Communication dated Aug. 27, 2014, issued by the European Patent Office in counterpart European Application No. 14175670.0.

* cited by examiner

*Primary Examiner* — Minh D A
(74) *Attorney, Agent, or Firm* — Sughrue Mion, PLLC

(57) ABSTRACT

A method of driving backlight of a display apparatus and the display apparatus are provided. The method includes: generating a control pulse configured to drive a backlight unit, the control pulse including: a first high pulse section configured to turn on the backlight unit; and an afterimage removal section configured to remove a frame afterimage; and inputting the control pulse into the backlight unit to alternately turn on and off the backlight unit, wherein the afterimage removal section comprises at least one second high pulse section having smaller duty than duty of the first high pulse section.

26 Claims, 9 Drawing Sheets

DISPLAY APPARATUS AND METHOD OF DRIVING BACKLIGHT THEREOF

CROSS-REFERENCE TO RELATED APPLICATION

This application claims priority under 35 U.S.C. §119 from Korean Patent Application No. 10-2013-0138326, filed on Nov. 14, 2013, in the Korean Intellectual Property Office, the disclosure of which is incorporated herein by reference in its entirety.

BACKGROUND

1. Field

Apparatuses and methods consistent with exemplary embodiments relate to providing a display apparatus and a method of driving backlight thereof, and more particularly, to providing a display apparatus that, if a dimming frequency of the display apparatus is lower than or equal to a preset frequency, reduces a flicker phenomenon, and a method of driving backlight thereof.

2. Description of the Related Art

A liquid crystal display (LCD) is thinner, lighter, and requires a lower driving voltage and lower power consumption than other types of display apparatuses and thus has been widely used. However, the LCD is a nonluminous device that does not emit light and thus requires an additional backlight unit for supplying light to a liquid crystal panel.

However, if the LCD displays consecutive frames, a section in which frames overlap each other is generated, and thus an afterimage is left. A method of dimming a light-emitting diode (LED) is used to solve this problem of the afterimage. In other words, an operation of turning on the LED for a preset time and an operation of turning off the LED for a preset time are alternately repeated to prevent a phenomenon in which an afterimage of a frame is left.

Specifically, a dimming method of an LED is classified into an analog dimming method and a digital dimming method. The analog dimming method refers to a method of adjusting an amount of current supplied to the LED to adjust brightness of the LED. A pulse width modulation (PWM) dimming method which is one of digital dimming methods refers to a method of adjusting a ratio between on and off times of the LED to adjust the brightness of the LED. For example, if a PWM signal in which a ratio between on and off times is 4:1 is provided to the LED, the brightness of the LED may be about 80% of maximum brightness.

If a basic dimming frequency is lower than or equal to a preset frequency (for example, 60 Hz), duration of each of the LED being turned on and turned off becomes longer. Therefore, there may occur a flicker phenomenon in which a user visually feels periodic changes of light intensity such as flickering of a screen. As a result, there is a need for a technology for mitigating such a flicker phenomenon.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus that, if a basic dimming frequency of the display apparatus is lower than or equal to 60 Hz, reduces a flicker phenomenon, and a method of driving backlight thereof.

According to an aspect of an exemplary embodiment, there is provided a method of driving backlight of a display apparatus. The method may include: generating a control pulse configured to drive a backlight unit, the control pulse including: a first high pulse section configured to turn on the backlight unit; and an afterimage removal section configured to remove a frame afterimage; and inputting the control pulse into the backlight unit to alternately turn on and off the backlight unit, wherein the afterimage removal section comprises at least one second high pulse section having smaller duty than duty of the first high pulse section.

The generating the control pulse may further include: detecting high pulse sections included in a basic dimming period; and reducing duty of each of remaining high pulse section other than the first high pulse section of the high pulse sections to generate the at least one second high pulse section.

The generating the control pulse may further include: generating a second pulse having duty corresponding to the at least one second high pulse section; and overlapping the second pulse with a basic control pulse to generate the control pulse.

The method may further include setting the duty of the at least one second high pulse section to be reduced in proportion to a size of a dimming frequency corresponding to a dimming period.

The method may further include setting the dimming frequency corresponding to a dimming period to a multiple of the basic dimming frequency, wherein a basic dimming frequency of the control pulse is lower than or equal to 60 Hz.

The method may further include in response to the dimming frequency corresponding to the dimming period being 120 Hz, setting a number of the at least one second high pulse sections to one, in response to the dimming frequency corresponding to the dimming period being 240 Hz, setting the number of the at least one second high pulse sections to three, and in response to the dimming frequency corresponding to the dimming period being 480 Hz, setting the number of second high pulse section to seven.

The method may further include setting a number of the at least one second high pulse sections according to a dimming frequency corresponding to a dimming period.

The method may further include determining whether a basic frequency of the inputted control pulse is lower than or equal to 60 Hz.

A non-transitory computer readable recording medium having recorded thereon a computer program for implementing the method described above.

According to an aspect of another exemplary embodiment, there is provided a display apparatus including: a display unit; a backlight unit configured to provide backlight to the display unit; and a backlight driver configured to generate a control pulse configured to drive the backlight unit and configured to input the control pulse into the backlight unit to alternately turn on and off the backlight unit, the control pulse including: a first high pulse section configured to turn on the backlight unit; and an afterimage removal section configured to remove a frame afterimage; and wherein the backlight driver is configured to provide at least one second high pulse section having smaller duty than duty of the first high pulse section in the afterimage removal section.

The backlight driver may be configured to detect high pulse sections included in a basic dimming period and configured to reduce duty of each of remaining high pulse section other than the first high pulse section of the high pulse sections to generate the at least one second high pulse section.

The backlight driver may be configured to generate a second pulse having duty corresponding to the at least one second high pulse section and configured to overlap the second pulse with a basic control pulse to generate the control pulse.

The backlight driver may be configured to set the duty of the at least one second high pulse section to be reduced in proportion to a size of a dimming frequency corresponding to a dimming period.

A basic dimming frequency of the control pulse may be lower than or equal to 60 Hz, and a dimming frequency corresponding to a dimming period may be set to a multiple of the basic dimming frequency.

In response to the dimming frequency corresponding to the dimming period being 120 Hz, the backlight driver may be configured to set a number of second high pulse section to one, in response to the dimming frequency corresponding to the dimming period being 240 Hz, the backlight driver may be configured to set the number of second high pulse section to three, and in response to the dimming frequency corresponding to the dimming period is 480 Hz, the backlight driver may be configured to set the number of second high pulse sections to seven.

The backlight driver may be configured to set a number of the at least one second high pulse sections according to a dimming frequency corresponding to a dimming period.

The backlight driver may be configured to determine whether a basic frequency of the inputted control pulse is lower than or equal to 60 Hz.

According to an aspect of another exemplary embodiment, there is provided a method of driving backlight of a display apparatus using a control pulse. The method may include: providing a basic control pulse including: a first high pulse section configured to turn on the backlight unit; and an afterimage removal section configured to remove a frame afterimage; and generating the control pulse by adding at least one second high pulse section having smaller duty than duty of the first high pulse section in the afterimage removal section.

The method may further include setting the duty of the at least one second high pulse section to be reduced in proportion to a size of a dimming frequency corresponding to a dimming period.

The method may further include setting a number of the at least one second high pulse sections according to a dimming frequency corresponding to a dimming period.

According to various exemplary embodiments of the present invention, if a basic dimming frequency of the display apparatus is lower than or equal to a preset frequency, a display apparatus which reduces a flicker phenomenon, and a method of driving backlight are provided.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
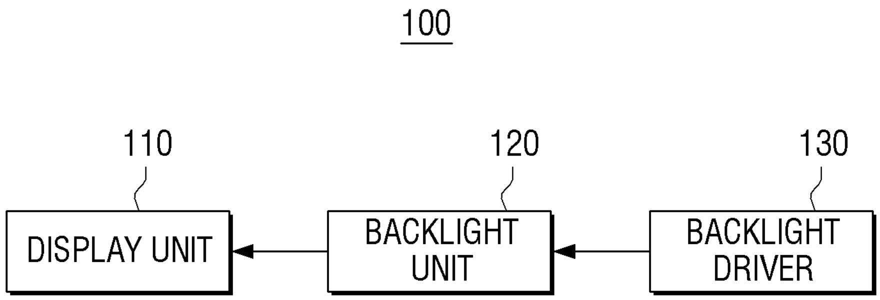
FIG. 1 is a block diagram illustrating a structure of a display apparatus according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, the exemplary embodiments can be carried out without those specifically defined matters. Also, well-known functions or constructions are not described in detail since the well-known functions or the constructions would obscure the exemplary embodiments with unnecessary detail.

FIG. 1 is a brief block diagram illustrating a structure of a display apparatus 100 according to an exemplary embodiment. As shown in FIG. 1, the display apparatus 100 includes a display unit 110, a backlight unit 120, and a backlight driver 130. Here, the display apparatus 100 may be a TV, but this is only an exemplary embodiment. The display apparatus 100 may be realized as various types of electronic devices such as a portable phone, a tablet personal computer (PC), a digital camera, a camcorder, a notebook PC, a personal digital assistant (PDA), etc.

The display unit 110 is an element that displays an image. In other words, the display unit 110 may sequentially display a plurality of frames. The display unit 110 may display a 2-dimensional (2D) image, a 3-dimensional (3D) image, an ultrahigh definition image, and an image having various resolutions.

The backlight unit 120 is an element that provides backlight to the display unit 110. In other words, if the display unit 110 is a nonluminous device that does not emit light, the backlight unit 120 may supply light to the display unit 110.

The backlight driver 130 is an element that drives the backlight unit 120. Specifically, the backlight driver 130 may generate a control pulse 1 and input the control pulse 1 into the backlight unit 120 to alternatively turn on and off the backlight unit 120.

The control pulse is a pulse signal for driving the backlight unit 120. In other words, a section in which an amplitude of the control pulse 1 is high corresponds to a section for turning on the backlight unit 120, and a section in which the amplitude of the control pulse 1 is low corresponds to a section for turning off the backlight unit 120. Also, although the control pulse 1 is high, brightness of the backlight unit 120 may vary according to a pulse size or a pulse amplitude of the control pulse 1. For example, if the pulse size or the pulse amplitude of the control pulse 1 doubles, the brightness of the backlight unit 120 may double.

Also, the control pulse 1 may include a first high pulse section 10 for turning on the backlight unit 120 and an afterimage removal section 10R for removing a frame afterimage, and at least one second high pulse section 20-1, . . . , and 20-$n$ having smaller duty than duty of the first high pulse section is arranged in the afterimage removal section 10R.

Figure 2:
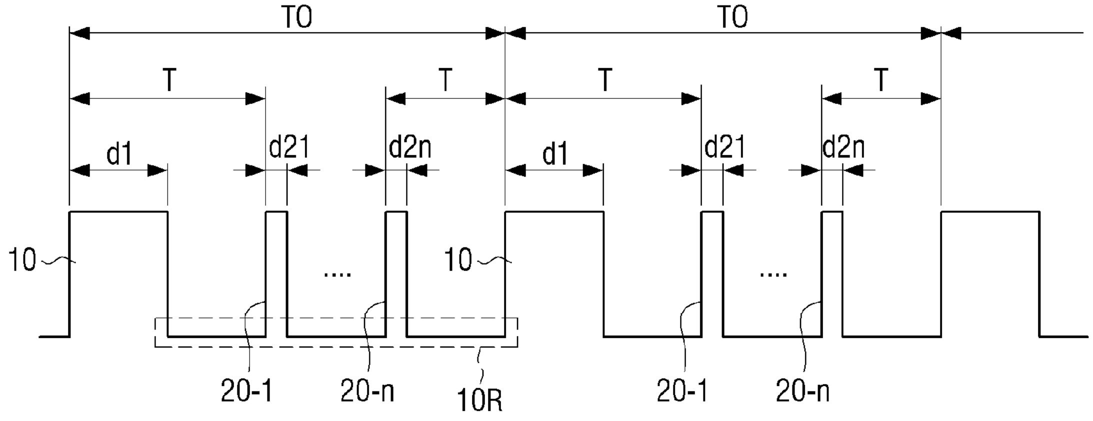
FIG. 2 is a view illustrating a control pulse for driving backlight, according to an exemplary embodiment.

In other words, as shown in FIG. 2, the control pulse 1 of the exemplary embodiment may include a first high pulse section 10 and at least one second high pulse sections 20-1, . . . , and 20-$n$ having smaller duties d21, . . . , and d2$n$ than duty d1 of the first high pulse section 10 within a basic dimming period T0.

In detail, if a basic dimming frequency corresponding to the basic dimming period T0 of the control pulse 1 is lower than or equal to 60 Hz, only the first high pulse section 10 exists within the basic dimming period T0, and any high pulse does not exist in an afterimage removal section 10R except the first high pulse section 10, a duration time of the afterimage removal section 10R becomes longer, and thus a flicker phenomenon may occur.

Therefore, the at least one second high pulse sections 20-1, . . . , and 20-$n$ arranged in the afterimage removal section 10R may reduce a flicker phenomenon.

Also, as shown in FIG. 2, each dimming period, T, of the first and the at least one second high pulse sections 10, 20-1, . . . , and 20-$n$ is equal to one another.

The backlight driver 130 may detect high pulse sections of a basic control pulse 1A (See FIG. 6) included in a basic dimming period T0 and reduce duties of the other high pulse sections except the first one of the high pulse sections to generate at least one second high pulse section 20-1, . . . , and 20-$n$. The backlight driver 130 may also generate a second pulse having duty corresponding to the second high pulse section and overlap the second pulse with the basic control pulse 1A to generate the control pulse 1. A method of generating the control pulse including the first and second high pulse sections will be described in detail later with references to FIGS. 3 and 6.

The backlight driver 130 may set duty of the second high pulse section to be reduced in proportion to a size of a dimming frequency corresponding to a dimming period. In other words, as the dimming frequency increases, the total number of high pulses existing in a basic dimming period T0 increases. Since only one first high pulse section exists, the number of second high pulse sections may be regarded as increasing.

Therefore, as the size of the dimming frequency increases, the number of second high pulse sections existing in the basic dimming period T0 in proportion to the size of the dimming frequency. As a result, the backlight driver 130 may set duties of the second high pulse sections to be reduced in proportion to the number of second high pulse sections.

Also, the basic dimming frequency of the control pulse may be set to be lower than or equal to 60 Hz, and the dimming frequency corresponding to the dimming period may be set as a multiple of the basic dimming frequency. For example, if the basic dimming frequency of the control pulse 1 is 60 Hz, the dimming frequency corresponding to the dimming period may be set to 120 Hz, 240 Hz, 480 Hz, or the like.

Also, if the dimming frequency is 120 Hz, the number of second high pulse sections in the basic dimming period T0 may be set to one. If the dimming frequency is 240 Hz, the number of second high pulse sections in the basic dimming period T0 may be set to three. If the dimming frequency is 480 Hz, the number of second high pulse sections in the basic dimming period T0 may be set to seven.

In other words, if the basic dimming frequency of the control pulse is 60 Hz, an afterimage removal section 10R for removing duty of a first high pulse section for turning on the backlight unit 120 and a frame afterimage may be 8.3 milli second (ms).

The dimming period is set to a multiple of the basic dimming frequency. Therefore, if the dimming frequency is set to 120 Hz which is a double of 60 Hz, two control pulses may exist in the basic dimming period T0. In this case, the duty of the first high pulse section may be reduced to 4.16 ms, and another control pulse except the first high pulse section is a second high pulse section and thus may have smaller duty than the first high pulse section. For example, duty of the second high pulse section may be 2.08 ms that is 0.5 times the duty of the first high pulse section.

As described above, a user may view an image, in which a flicker phenomenon is reduced, through a display apparatus including a backlight unit driven by a control pulse having first and second high pulse sections.

A method of generating a control pulse 1 for driving backlight according to an exemplary embodiment will now be described in detail with reference to FIGS. 3A through 3C.

Figure 3A:
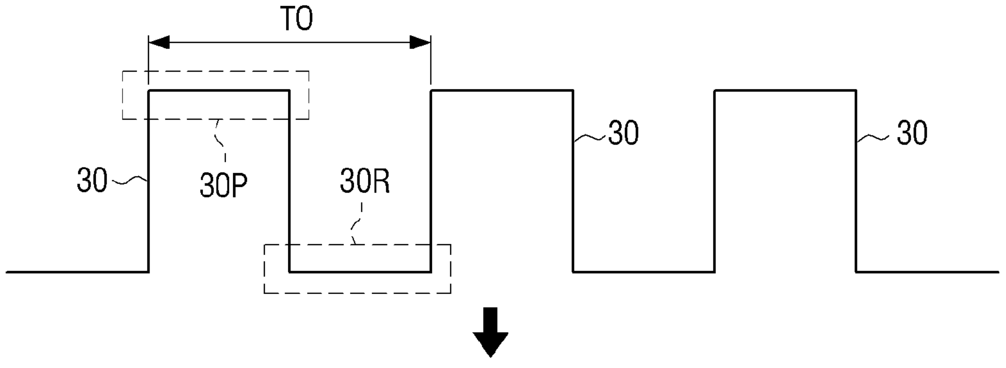
FIGS. 3A-3C are views illustrating a method of generating a control pulse, according to an exemplary embodiment.
Figure 3B:
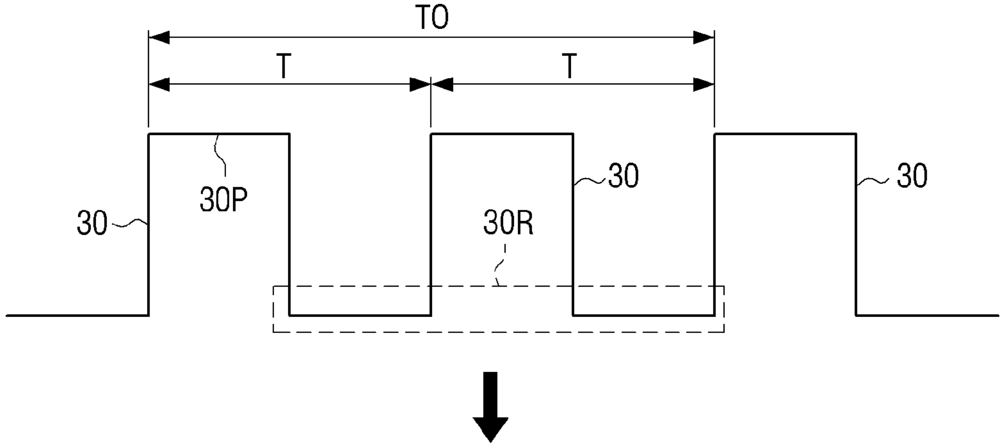
Figure 3C:
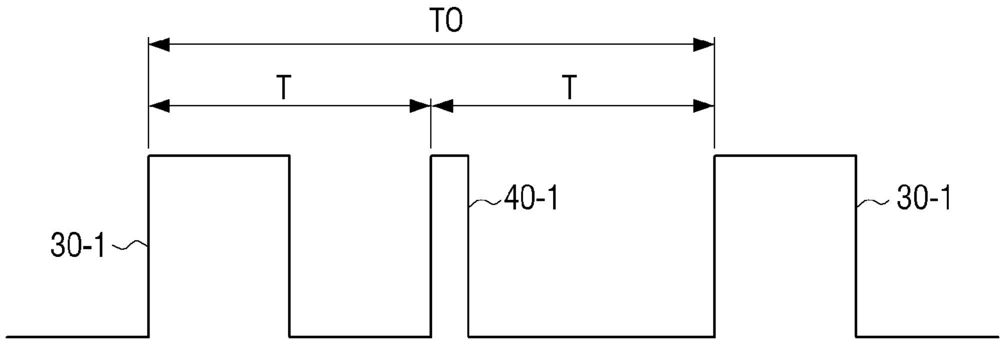

As shown in FIG. 3A, the backlight driver 130 may generate a control pulse 30 for driving the backlight unit 120. The control pulse 30 may include a first high pulse section 30P for turning on the backlight unit 120 and an afterimage removal section 30R for removing a frame afterimage in a basic dimming period T0. In the exemplary embodiment, the first high pulse section 30P may have duty of 0.5 times the basic dimming period T0. The backlight unit 120 may provide light to the display unit 110 in the first high pulse section 30P and does not provide light to the display unit 110 in the afterimage removal section 30R. Therefore, the backlight unit 120 may be alternately turned on and off.

The backlight driver 130 may set a dimming period T for generating a second high pulse section having smaller duty than duty of the first high pulse section in the afterimage removal section 30R. In FIG. 3B, the backlight driver 130 sets the dimming period T to 0.5 times the basic dimming period T0. In this case, two control pulses 30 may exist in the basic dimming period T0.

The backlight driver 130 may determine one of the control pulses 30 in the basic dimming period T0 as a first high pulse section 30-1 to reduce duty and reduce duty of the other one of the control pulses 30 to be smaller than duty of the first high pulse section 30-1 in order to generate a second high pulse section 40-1. The first high pulse section 30-1 exists, and then the second high pulse section 40-1 exists in FIG. 3C, but this is only an exemplary embodiment. Orders of the first and second high pulse sections 30-1 and 40-1 may be reversed.

In other words, the backlight driver 130 may generate a control pulse including the first high pulse section 30-1 having smaller duty (for example, 50%) than duty of the control pulse 30 of the basic dimming period T0 in the dimming period T and the second high pulse section 40-1 having smaller duty (or example, 25%) than the duty of the control pulse 30 and the duty of the first high pulse section 30-1.

Figure 4:
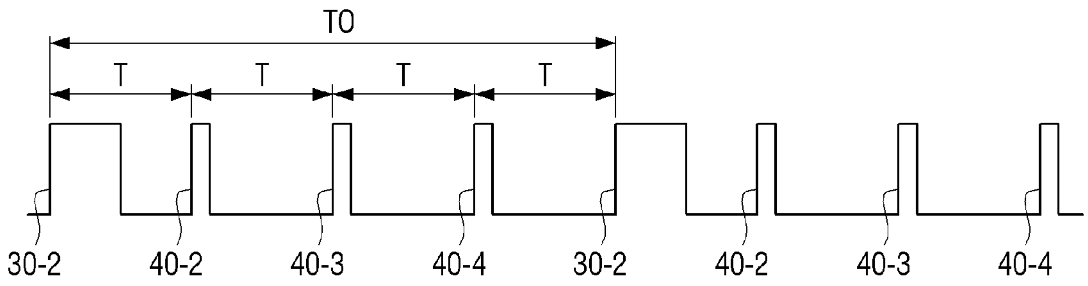
FIGS. 4 and 5 are views illustrating a control pulse according to various exemplary embodiments.

FIG. 4 illustrates a basic dimming period T0 including four (4) dimming periods T set by the backlight unit 130. If the dimming period T is set to ¼ of the basic dimming period T0, four control pulses exist in the basic dimming period T0.

Therefore, the backlight driver 130 may generate a control pulse including a first high pulse section 30-2 having smaller duty (for example, 30%) than the duty of the control pulse 30 of the basic dimming period T0 in the dimming period T and second high pulse sections 40-2, 40-3, and 40-4 having smaller duties (for example, 10%) than the duty of the control pulse 30 and the duty of the firs high pulse section 30-2.

Figure 5:
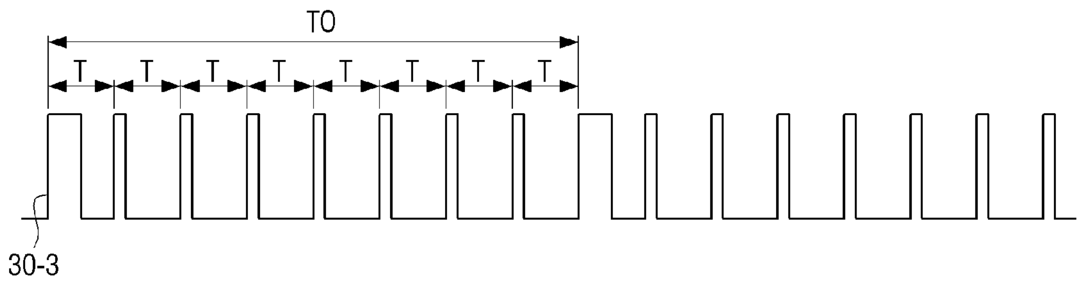

FIG. 5 illustrates a basic dimming period T0 including eight (8) dimming periods T set by the backlight driver 230. If the dimming period T is set to ⅛ of the basic dimming period T0, eight control pulses exist in the basic dimming period T0.

Therefore, the backlight driver 130 may generate a control pulse including a first high pulse section 30-3 having smaller duty (for example, 15%) than the duty of the control pulse 30 of the basic dimming period T0 in the dimming period T and second high pulse sections having smaller duties (for example, 5%) than the duty of the control pulse 30 and the duty of the first high pulse section 30-3.

Figure 6:
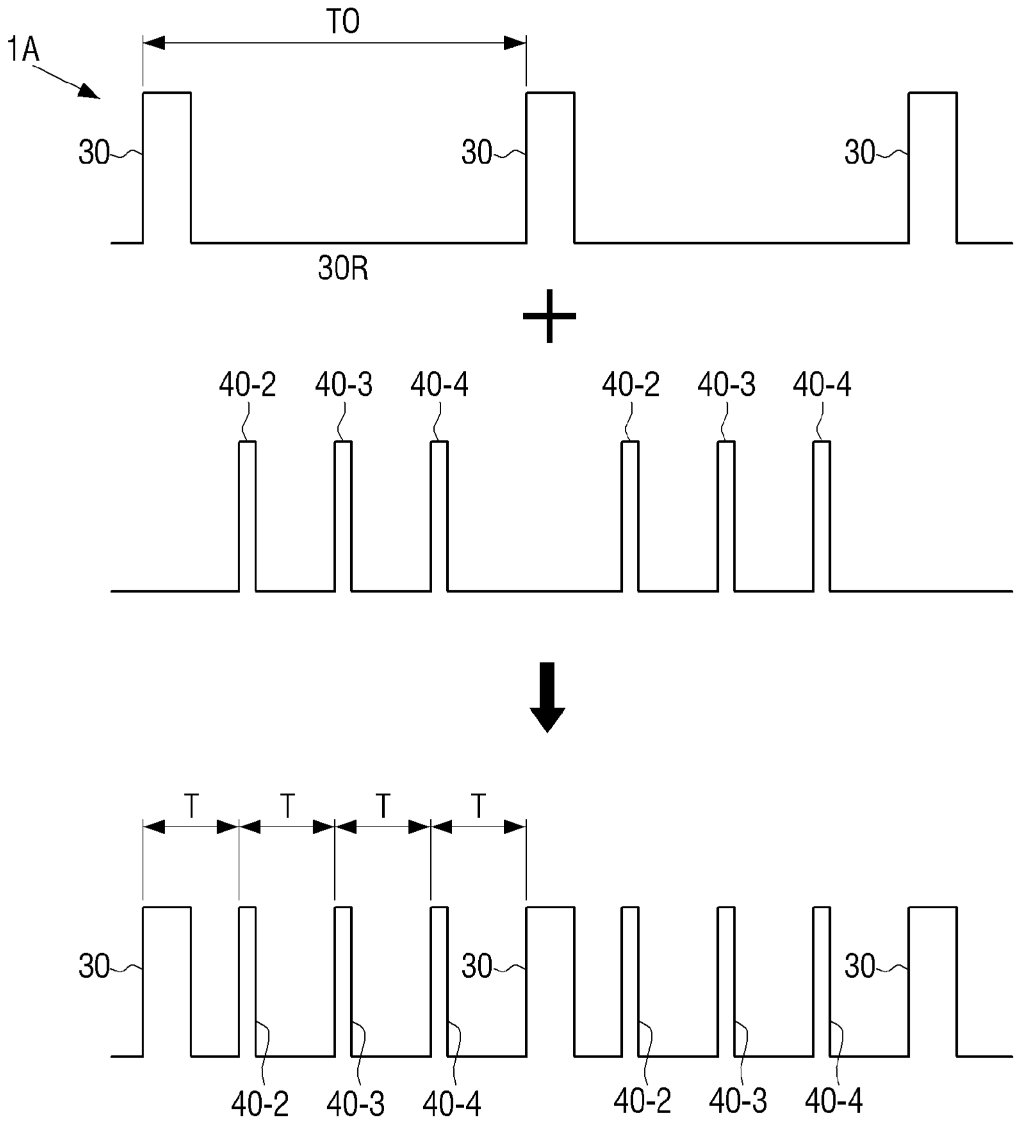
FIG. 6 is a view illustrating a method of generating a control pulse, according to another exemplary embodiment.

A method of generating a control pulse for driving backlight according to an exemplary embodiment will now be described with reference to FIG. 6.

The backlight driver 130 may generate a second pulse having duty corresponding to a second high pulse section and overlap the second pulse with a basic control pulse 1A to generate a control pulse for driving the backlight unit 120.

In detail, the backlight driver 130 may generate a control pulse including a first high pulse section 30 for turning on the backlight unit 120 and generate second pulses 40-2, 40-3, and 40-4 corresponding to second high pulses that exist in an afterimage removal section not in the first high pulse section 30 and have duties than duty of the first high pulse section 30.

In other words, the backlight driver 130 may separately generate a control pulse including the first high pulse section 30 and the second pulses 40-2, 40-3, and 40-4 corresponding to second high pulse sections and overlap the control pulse with the second pulses 40-2, 40-3, and 40-4 to generate a control pulse including first and second high pulse sections.

Figure 7:
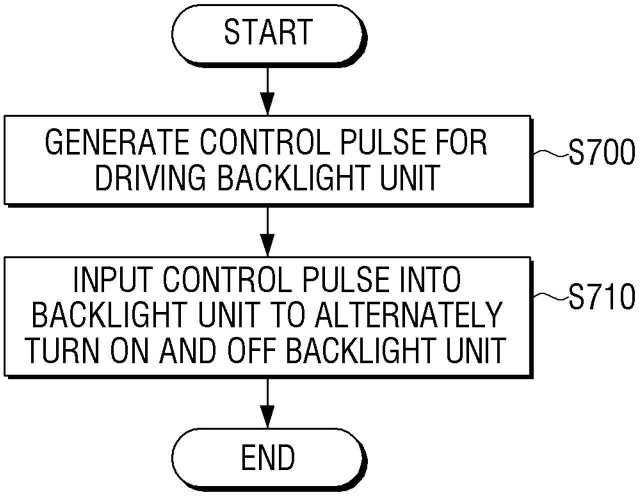
FIGS. 7 through 9 are flowcharts illustrating a method of generating a control pulse to drive backlight, according to various exemplary embodiments.
Figure 8:
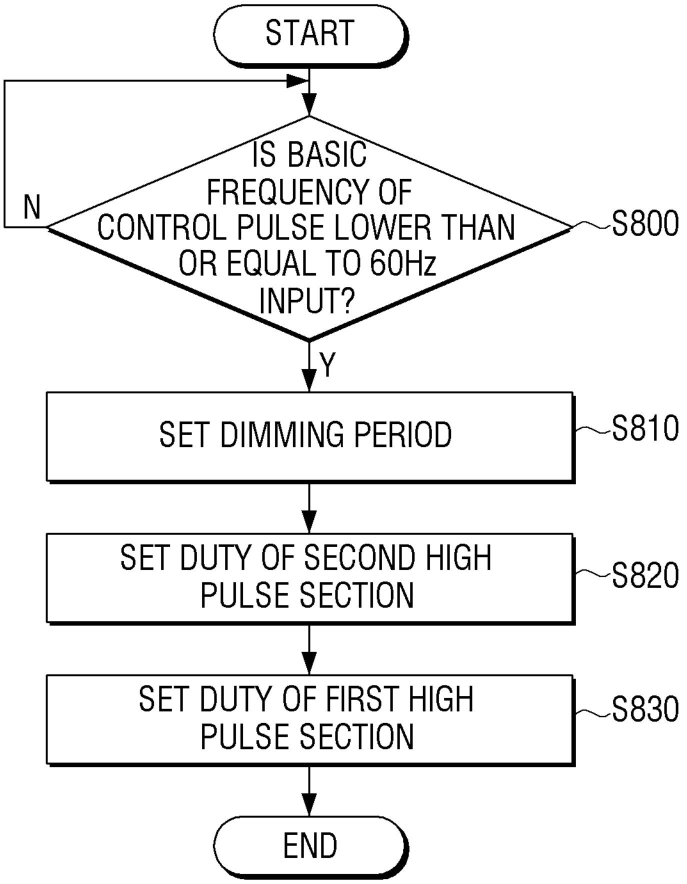
Figure 9:
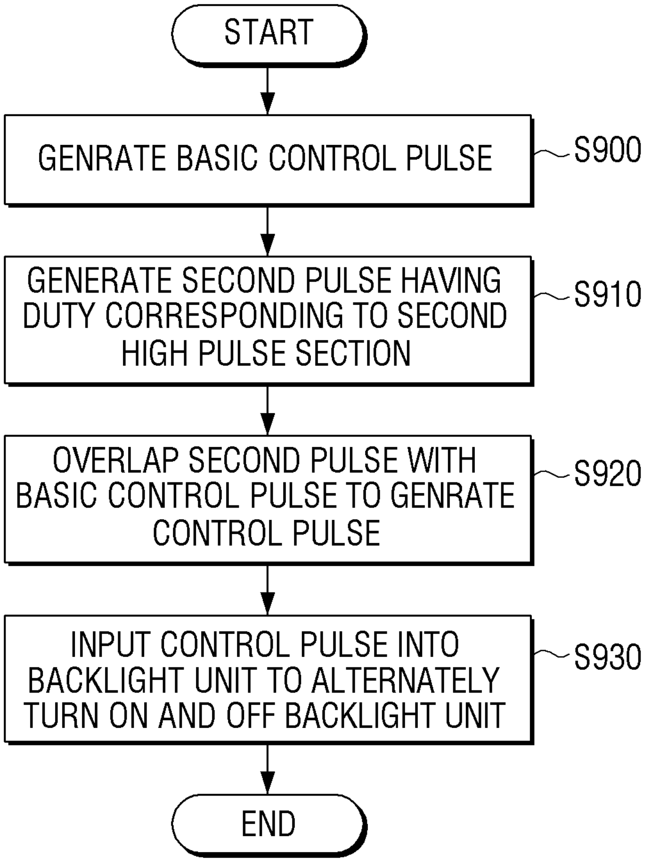

FIGS. 7 through 9 are flowcharts illustrating a method of generating a control pulse to drive backlight according to various exemplary embodiments.

As shown in FIG. 7, in operation S700, the display apparatus 100 generates a control pulse for driving the backlight unit 120. The control pulse is a pulse signal for driving the backlight unit 120. In other words, a section in which the control pulse has high amplitude is a section for turning on the backlight unit 120, and a section in which the control pulse has low amplitude is a section for turning off the backlight unit 120. Also, although the control pulse has the high amplitude, brightness of the backlight unit 120 may vary according to a pulse amplitude of the control pulse. For example, if the pulse amplitude of the control pulse doubles, the brightness of the backlight unit 120 may double.

In operation S710, the display apparatus 100 inputs the control pulse into the backlight unit 120 to alternately turn on and off the backlight unit 120. The control pulse may include a first high pulse section for turning on the backlight unit 120 and an afterimage removal section for removing a frame afterimage, and at least one high pulse section having smaller duty than duty of the first high pulse section may be arranged in the afterimage removal section.

In other words, the display apparatus 100 may arrange the at least one second high pulse section having smaller duty than the duty of the first high pulse section in the afterimage removal section so that the afterimage removal section does not become long enough to cause a flicker phenomenon.

As shown in FIG. 8, the display apparatus may determine whether a basic dimming frequency of a control pulse lower than or equal to 60 Hz is input and generate a control pulse including first and second high pulse sections according to an exemplary embodiment.

In detail, in operation S800, the display apparatus 100 determines whether the basic dimming frequency of the control pulse lower than or equal to 60 Hz is input. If it is determined in operation S800 that the basic dimming frequency of the control pulse lower than or equal to 60 Hz is input, the display apparatus 100 sets a dimming period in operation S810. A dimming frequency corresponding to the dimming period may be set to a multiple of the basic dimming frequency. In other words, since the basic dimming frequency is 60 Hz, the dimming frequency corresponding to the dimming period may be set to 120 Hz, 240 Hz, 480 Hz, or the like.

In operation S820, the display apparatus 100 sets duty of a second high pulse section. In operation S830, the display apparatus 100 sets duty of a first high pulse section. However, the exemplary embodiment is not limited thereto, and the display apparatus 100 may simultaneously set the duties of the first and second high pulse sections or may set the duties of the first and second high pulse sections in reversed order. Also, the duty of the first high pulse section may be smaller than the duty of the second high pulse section.

According to an exemplary embodiment, as shown in FIG. 9, in operation S900, the display apparatus 100 generates a basic control pulse 1A. The basic control pulse 1A includes a pulse section 30 for turning on the backlight unit 120 and an afterimage removal section 30R for removing a frame afterimage. Also, a basic dimming frequency corresponding to a period of the basic control pulse 1A may be lower than or equal to 60 Hz.

In operation S910, the display apparatus 100 generates a second pulse having duty corresponding to a second high pulse section. In detail, a second pulse may exist in the afterimage removal section not in the pulse section for turning on the backlight unit 120 and have smaller duty than duty of the pulse section for turning on the backlight unit 120.

In operation S920, the display apparatus 100 overlaps the basic control pulse 1A with the second pulse to generate a control pulse. In other words, the display apparatus 100 may separately generate the basic control pulse 1A including the pulse section for turning on the backlight unit 120 and the second pulse corresponding to the second high pulse section and overlaps the basic control pulse 1A with the second pulse.

In operation S930, the display apparatus 100 inputs the control pulse into the backlight unit 120 to alternately turn on and off the backlight unit 120.

As described above, according to various exemplary embodiments, a user may view an image in which a flicker phenomenon is reduced, through a display apparatus including a backlight unit driven by a control pulse including a basic control pulse and a second high pulse section.

According to various exemplary embodiments as described above, there may be provided a display apparatus that, if a basic dimming frequency of a display apparatus is lower than or equal to a preset frequency, a flicker phenomenon is reduced, and a method of driving backlight thereof.

The method of driving the backlight unit of the display apparatus according to the above-described various exemplary embodiments may be coded as software and then stored on a non-transitory readable medium. The non-transitory readable medium may be mounted and used on various types of apparatuses.

The non-transitory readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

While exemplary embodiments have been particularly shown and descried above, it will be understood by those of ordinary skill in the art that various changes in form and details may be made therein without departing from the spirit and scope of the inventive concept as defined by the following claims.

What is claimed is:

1. A method of driving a backlight of a display apparatus, the method comprising:
- generating a control pulse configured to drive a backlight unit; and
- inputting the control pulse into the backlight unit to alternately turn on and off the backlight unit,
- wherein the control pulse comprises:
  - a basic dimming period comprising a first dimming period and at least one second dimming period, the first dimming period being equal to the at least one second dimming period;
  - a first high pulse section configured to turn on the backlight unit and arranged in the first dimming period;
  - a second high pulse section having a smaller duty than a duty of the first high pulse section and arranged in the at least one second dimming period; and
  - an afterimage removal section configured to remove a frame afterimage and included in the at least one second dimming period.

2. The method of claim 1, wherein the generating the control pulse further comprises:
- detecting high pulse sections included in the basic dimming period; and
- reducing duty of each of remaining high pulse section other than the first high pulse section of the high pulse sections to generate the at least one second high pulse section.

3. The method of claim 1, wherein the generating the control pulse further comprises:
- generating a second pulse having duty corresponding to the second high pulse section; and
- overlapping the second pulse with a basic control pulse to generate the control pulse.

4. The method of claim 1, further comprising:
- setting the duty of the one second high pulse section to be reduced in proportion to a size of a dimming frequency corresponding to a dimming period.

5. The method of claim 1 further comprising setting the dimming frequency corresponding to a dimming period to a multiple of the basic dimming frequency,
- wherein a basic dimming frequency of the control pulse is lower than or equal to 60 Hz.

6. The method of claim 1, wherein in response to the dimming frequency corresponding to the dimming period being 120 Hz, setting a number of the second high pulse section to one, in response to the dimming frequency corresponding to the dimming period being 240 Hz, setting the number of the second high pulse section to three, and in response to the dimming frequency corresponding to the dimming period being 480 Hz, setting the number of second high pulse section to seven.

7. The method of claim 1 further comprising setting a number of the second high pulse section according to a dimming frequency corresponding to a dimming period.

8. The method of claim 1 further comprising determining whether a basic frequency of the inputted control pulse is lower than or equal to 60 Hz.

9. A non-transitory computer readable recording medium having recorded thereon a computer program for implementing the method of claim 1.

10. The display apparatus of claim 9, wherein in response to the dimming frequency corresponding to the dimming period being 120 Hz, the backlight driver is configured to set a number of second high pulse section to one, in response to the dimming frequency corresponding to the dimming period being 240 Hz, the backlight driver is configured to set the number of second high pulse section to three, and in response to the dimming frequency corresponding to the dimming period is 480 Hz, the backlight driver is configured to set the number of second high pulse sections to seven.

11. The method of claim 1, wherein the second high pulse section comprises at least one second high pulse configured to remove the frame afterimage generated by the first high pulse section comprising a first high pulse.

12. The method of claim 1, wherein the control pulse is configured to drive a single backlight unit.

13. A display apparatus comprising:
- a display unit;
- a backlight unit configured to provide backlight to the display unit; and
- a backlight driver configured to generate a control pulse configured to drive the backlight unit and configured to input the control pulse into the backlight unit to alternately turn on and off the backlight unit, the control pulse comprising:
  - a basic dimming period comprising a first dimming period and at least one second dimming period, the first dimming period being equal to the at least one second dimming period;
  - a first high pulse section configured to turn on the backlight unit and arranged in the first dimming period;
  - a second high pulse section having a smaller duty than a duty of the first high pulse section and arranged in the at least one second dimming period; and
  - an afterimage removal section configured to remove a frame afterimage and included in the at least one second dimming period.

14. The display apparatus of claim 13, wherein the backlight driver is configured to detect high pulse sections included in the basic dimming period and configured to reduce duty of each of remaining high pulse section other than the first high pulse section of the high pulse sections to generate the at least one second high pulse section.

15. The display apparatus of claim 13, wherein the backlight driver is configured to generate a second pulse having duty corresponding to the second high pulse section and configured to overlap the second pulse with a basic control pulse to generate the control pulse.

16. The display apparatus of claim 13, wherein the backlight driver is configured to set the duty of the second high pulse section to be reduced in proportion to a size of a dimming frequency corresponding to a dimming period.

17. The display apparatus of claim 13, wherein a basic dimming frequency of the control pulse is lower than or equal to 60 Hz, and a dimming frequency corresponding to a dimming period is set to a multiple of the basic dimming frequency.

18. The display apparatus of claim 13, wherein the backlight driver is configured to set a number of the second high pulse section according to a dimming frequency corresponding to a dimming period.

19. The display apparatus of claim 13, wherein the backlight driver is configured to determine whether a basic frequency of the inputted control pulse is lower than or equal to 60 Hz.

20. The display apparatus of claim 13, wherein the second high pulse section comprises at least one second high pulse configured to remove the frame afterimage generated by the first high pulse section comprising a first high pulse.

21. The display apparatus of claim 13, wherein the control pulse is configured to drive a single backlight unit.

22. A method of driving backlight of a display apparatus using a control pulse, the method comprising:

providing a basic control pulse comprising:

a basic dimming period comprising a first dimming period and at least one second dimming period, the first dimming period being equal to the at least one second dimming period;

a first high pulse section configured to turn on a backlight unit of the display apparatus and arranged in the first dimming period;

a second high pulse section having a smaller duty than a duty of the first high pulse section and arranged in the at least one second dimming period; and an afterimage removal section configured to remove a frame afterimage and included in the at least one second dimming period.

23. The method of claim 22, further comprising setting the duty of the at least one second high pulse section to be reduced in proportion to a size of a dimming frequency corresponding to a dimming period.

24. The method of claim 22 further comprising setting a number of the at least one second high pulse section according to a dimming frequency corresponding to a dimming period.

25. The method of claim 22, wherein the second high pulse section comprises at least one second high pulse configured to remove the frame afterimage generated by the first high pulse section comprising a first high pulse.

26. The method of claim 22, wherein the basic control pulse is configured to drive a single backlight unit.

* * * * *